(12) United States Patent
Youn et al.

(10) Patent No.: US 8,305,952 B2
(45) Date of Patent: Nov. 6, 2012

(54) METHOD OF CONTROLLING FEEDBACK CHANNEL IN COMMUNICATION SYSTEM COMPRISING AT LEAST ONE RELAY STATION

(75) Inventors: Ae Ran Youn, Anyang-Si (KR); Yong Ho Kim, Anyang-Si (KR); Ki Seon Ryu, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 300 days.

(21) Appl. No.: 12/671,461

(22) PCT Filed: Jul. 30, 2008

(86) PCT No.: PCT/KR2008/004444
§ 371 (c)(1),
(2), (4) Date: Jan. 29, 2010

(87) PCT Pub. No.: WO2009/017365
PCT Pub. Date: Feb. 5, 2009

(65) Prior Publication Data
US 2010/0260095 A1 Oct. 14, 2010

(30) Foreign Application Priority Data

Jul. 30, 2007 (KR) .................. 10-2007-0076418

(51) Int. Cl.
*H04B 7/14* (2006.01)

(52) U.S. Cl. ........ 370/315; 370/252; 370/332; 455/450; 455/452.2; 455/7; 455/9

(58) Field of Classification Search ................ None
See application file for complete search history.

(56) References Cited

U.S. PATENT DOCUMENTS

| 2006/0211378 | A1* | 9/2006 | Gaal et al. ................ 455/69 |
| 2007/0081483 | A1  | 4/2007 | Jang et al. |
| 2008/0227461 | A1* | 9/2008 | Dayal et al. ............ 455/452.2 |
| 2009/0219852 | A1* | 9/2009 | Youn et al. ............... 370/315 |

FOREIGN PATENT DOCUMENTS

| KR | 10-2007-0075748 A | | 7/2007 |
| WO | WO 2007/055544 | * | 5/2007 |
| WO | WO-2007/055544 A2 | | 5/2007 |

* cited by examiner

*Primary Examiner* — Chi Pham
*Assistant Examiner* — Mohammad Adhami
(74) *Attorney, Agent, or Firm* — Birch, Stewart, Kolasch & Birch, LLP (57) ABSTRACT

A method for controlling a feedback channel in a communication system including a relay station (RS) is disclosed. In a method for controlling transmission/reception of a channel quality information feedback in a wireless communication system including a relay station (RS), the RS receives total channel quality information from a mobile station (MS), transmits the channel quality information to a base station (BS), receives a delta CQI from the mobile station (MS), and transmits the delta CQI to the base station (BS) according to control information.

11 Claims, 7 Drawing Sheets

METHOD OF CONTROLLING FEEDBACK CHANNEL IN COMMUNICATION SYSTEM COMPRISING AT LEAST ONE RELAY STATION

TECHNICAL FIELD

The present invention relates to a communication system including a relay station (RS), and more particularly to a method for allowing the RS to report a channel status between the RS and a mobile station (MS) to a base station (BS).

BACKGROUND ART

Recently, a relay station (RS) has been introduced to extend a cell coverage and increase a throughput. The relay station (RS) supports a conventional IEEE 802.16e-based mobile station (MS), and performs a function of an active repeater. The active repeater includes some functions of a base station (BS), a network entry and mobility of a PMP (Point-to-MultiPoint)-based RS, a radio resource management (RRM) function, and a security function.

Figure 1:
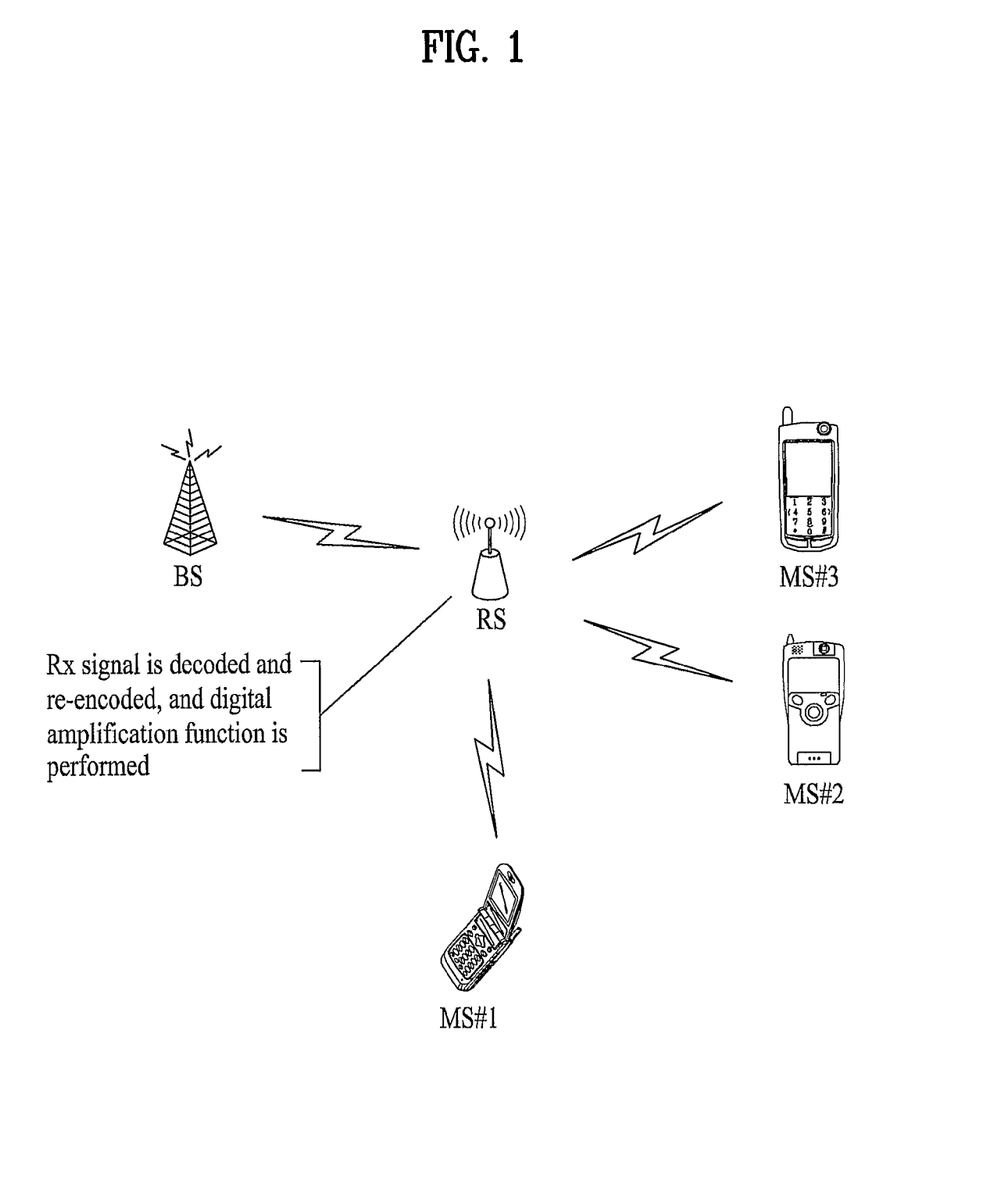
FIG. 1 is a conceptual diagram illustrating a communication system to which a relay station (RS) is applied.

FIG. 1 is a conceptual diagram illustrating a communication system to which a relay station (RS) is applied. In FIG. 1, the relay station (RS) decodes a signal received from a RS's reception end, re-encodes the decoded signal, and transmits the encoded signal to a RS's transmission end, such that noise can be removed. Also, the relay station (RS) serves as a digital amplifier capable of acquiring a high throughput using a higher date-rate encoding process.

The above-mentioned relay station (RS) can be classified into a fixed RS, a nomadic RS, and a mobile RS.

The fixed RS is permanently fixed, such that it is used to increase a cell coverage and shadow area. The fixed RS can also be used as a simple repeater.

The nomadic RS may be temporarily installed when the number of users suddenly increases, or may freely move in a building.

The mobile RS may be mounted to a variety of public transportations such as a bus or subway.

In the relay station (RS), a frame structure is modified into another frame structure to support the RS on the basis of a frame structure of a conventional OFDMA physical layer. Firstly, the conventional OFDMA frame structure will hereinafter be described in detail.

Figure 2:
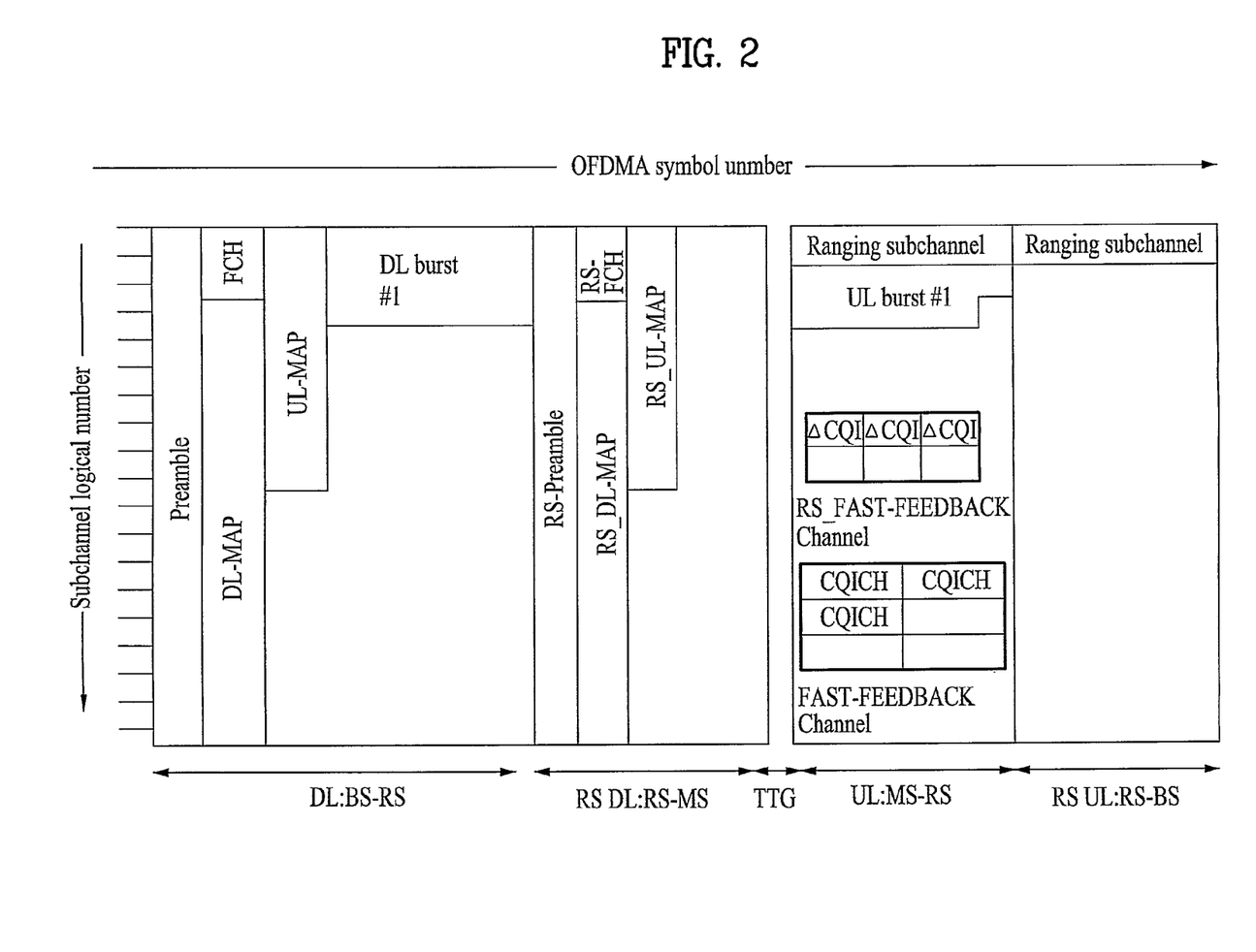
FIG. 2 is a structural diagram illustrating a frame structure of a conventional OFDMA physical layer.

FIG. 2 is a structural diagram illustrating a frame structure of the conventional OFDMA physical layer.

Referring to FIG. 2, a downlink sub-frame begins at a preamble used to establish synchronization and equalization at a physical layer. Then, the structure of an overall frame is defined by a broadcast-type downlink map (DL-MAP) message and an uplink map (UL-MAP) message. The DL-MAP message is used to define the location and usage of each burst allocated to the downlink. The UL-MAP message is used to define the location and usage of each burst allocated to the uplink. DL-MAP, DL-MAP IE, UL-MAP, and UL-MAP IE are equal to DL-MAP, DL-MAP IE, UL-MAP, and UL-MAP IE for use in the IEEE 802.16 system capable of supporting the conventional OFDMA system, and have been designed on the basis of the IEEE 802.16e-2005.

The DL-MAP message defines usages allocated to bursts of a downlink interval in a burst-mode physical layer. The UL-MAP message defines usages of bursts allocated to an uplink interval. An information element (IE) constructing the DL-MAP message is used to discriminate downlink traffic intervals of users by a downlink interval usage code (DIUC), a connection identifier (CID), and burst location information (i.e., sub-channel offset, a symbol-offset, the number of sub-channels, and the number of symbols). In the meantime, the information element constructing the UL-MAP message decides its usage by an uplink interval usage code (UIUC) for each CID, and defines the location of a corresponding interval by duration information. In this case, usages of individual intervals are decided according to a UIUC value used in the UL-MAP. Each interval begins at a specific position, which is spaced apart from a previous IE start point by a duration prescribed in the UL-MAP IE.

The UL-MAP message allocates the authority of using an uplink channel. The UL-MAP message defines how to use uplink bursts using consecutive information elements (IEs) capable of defining the method of using individual uplink intervals. The UL-MAP message defines how to use uplink resources allocated as a block unit of either an OFDMA symbol or a sub-channel. The UL-MAP information element (IE) designates band allocation information of an uplink. Each UL-MAP message includes at least one IE to indicate the end of the last burst. The order of IEs transmitted by the UL-MAP message is decided by a used physical layer.

The CID allocates the IE to unicast, multicast, and broadcast addresses. If the allocation of a bandwidth approval is clearly designated, a basic CID of a mobile station (MS) is used as a CID value. The UIUC is used to designate an uplink usage format and associated uplink burst profile. In the case of each UIUC to be used for the UL-MAP, an Uplink_Burst_Profile must be contained in an Uplink Channel Descriptor (UCD). All Information elements (IEs) must be supported by mobile stations. When the UL-MAP message is generated, the base station (BS) is able to freely use any of IEs of the generated UL-MAP message without generating any problems.

Next, a frame structure for supporting the relay station (RS) will hereinafter be described. The RS frame structure establishes a DL relay zone and a UL relay zone of the RS contained in the frame. Data transmitted from the base station (BS) to the relay station (RS) is allocated as a burst format to a frame downlink. Data transmitted from the RS to the mobile station (MS) is allocated to a downlink zone of the relay station (RS). If there is data to be transmitted from the mobile station (MS) to the base station (BS), this data is transmitted from the RS uplink zone to an allocation zone for each MS. The RS includes the resultant data in a zone allocated from an uplink to the RS.

Next, a feedback method of a mobile station (MS) according to a conventional art will hereinafter be described with reference to the frame structure.

In the conventional art of the OFDM or OFDMA wireless communication system, a base station (BS) allocates a predetermined area for receiving a feedback result of a measurement value of a downlink channel status from a mobile station (MS), and requests a downlink QoS (Quality of Signal) from the mobile station (MS). A conventional mobile communication system uses a variety of methods for allowing the base station (BS) to request a downlink QoS from the mobile station (MS), for example, a method of using a Channel Quality Information CHannel (CQICH). In order to allow the base station (BS) to acquire a downlink QoS of the mobile station (MS), the base station (BS) pre-allocates some zones of an uplink two-dimensional (2D) map to a CQICH dedicated channel, and then designates a sub-channel to be used for each MS.

After a CQICH zone is pre-allocated using a fast feedback channel of the UL-MAP IE contained in the UL-MAP message, a slot is allocated to each MS using 'CQICH_Allocation_IE' or 'CQICH_Enhance_Allocation_IE'. The 'CQICH_Allocation_IE' message dynamically allocates a CQICH to a MS uplink, or cancels the allocated area. If the CQICH has been allocated to the MS uplink, the mobile station (MS) transmits QoS information to the allocated CQICH area at intervals of a given period prescribed in the 'CQICH_Allocation_IE' message. If the CQICH channel to which the mobile station (MS) has been allocated is cancelled, i.e., if a duration parameter of the 'CQICH_Allocation_IE' message is set to '0', the mobile station (MS) does not transmit QoS information to the base station (BS). If the relay station (RS) is installed between the base station (BS) and the MS and is then operated, RS-reflected MAC information and associated parameters are adjusted, and the adjusted information and parameters are used. In a broadband wireless access system technology based on the conventional mobile RS, channel quality information (CQI) is transmitted through a fast feedback channel to adjust a Modulation and Coding Scheme (MCS) level and decide a path between the MS and the base station (BS).

The following table 1 illustrates 'CQICH_Allocation_IE' prescribed in the conventional IEEE 802.16e-2005.

TABLE 1

| Syntax | Size | Notes |
|---|---|---|
| CQICH Alloc IE( ) { | | |
| Extended UIUC | 4 bits | CQICH = 0x03 |
| Length | 4 bits | Length of the message in bytes (variable) |
| CQICH_ID | Variable | Index to uniquely identify the CQICH resource assigned to the SS. The size of this field is dependent on system parameter defined in UCD. |
| Allocation offset | 6 bits | Index to the fast feedback channel region marked by UIUC = 0. |
| Period (p) | 2 bits | A CQI feedback is transmitted on the CQICH every $2^p$ frames. |
| Frame offset | 3 bits | The SS starts reporting at the frame of which the number has the same 3 LSB as the specified frame offset. If the current frame is specified, the SS should start reporting in eight frames. |
| Duration (d) | 3 bits | A CQI feedback is transmitted on the CQI channels indexed by the CQICH_ID for 10x2d frames. If d==0, the CQICH is deallocated. If d==0b111, the SS should report until the BS command for the SS to stop. |
| Report configuration included | 1 bit | Update to CINR report configuration is included. |
| If (report configuration included ==1){ | | |
| Feedback Type | 2 bits | 0b00 = physical CINR feedback 0b01 = effective CINR feedback 0b10-0b11 = Reserved |
| Report Type | 1 bit | 0: Report for preamble 1: Report for specific permutation zone |
| If (Report type == 0){ | | |
| CINR preamble report type | 1 bit | The type of preamble-based CINR report 0 - Frequency reuse factor=1 configuration 1 - Frequency reuse factor=3 configuration |
| } | | |
| Else { | | report for permutation zone |
| Zone permutation | 3 bits | The type of zone for which to report 0b000—PUSC with 'use all SC=0' 0b001— PUSC with 'use all SC = 1' 0b010— FUSC 0b011— Optional FUSC 0b100—Safety Channel region 0b101— AMC zone (only applicable to AAS mode) 0b110-111— Reserved |
| Zone type | 2 bits | 0b00— non-STC zone 0b01— STC zone 0b10—AAS zone 0b11—reserved |
| Zone PRBS_ID | 2 bits | The PRBS_ID of the zone on which to report |
| If(Zone type== 0b000 or 0b001) { | | |
| Major group indication | 1 bit | If '0' then the report may refer to any subchannel in the PUSC zone. |
| If(Major group indication ==1) { | | |
| PUSC Major group bitmap | 6 bits | Reported CINR shall only apply to the subchannel of PUSC major groups for which the corresponding bit is set. |

TABLE 1-continued

| Syntax | Size | Notes |
|---|---|---|
| | | Bit #k refers to major group k. |
| } | | |
| } | | |
| CINR zone measurement type | 1 bit | 0: measurement from pilot subcarrier and, if AAS zone, from AAS preamble. 1: measurement from data subcarriers |
| } | | |
| If(feedback type == 0b00 { Averaging parameter included If (Averaging parameter included == 1) { | 1 bit | Physical CINR feedback |
| Averaging parameter | 4 bits | Averaging parameter used for deriving physical CINR estimates reported through CQICH. This value is given in multiples of 1/16 in the range of [1/16..16/16] in increasing order. $a_{avg}$ |
| } } } | | |
| MIMO_permutation_feedback_cycle | 2 bits | 0b00=No MIMO and permutation mode feedback 0b01=The MIMO and permutation mode indication shall be transmitted on the CQICH indexed by the CQICH_ID every four allocated CQICH transmission opportunity. The first indication is sent on the fourth allocated CQICH frame transmission opportunity. 0b10=The MIMO mode and permutation mode indication shall be transmited on the CQICH indexed by the CQICH_ID every eight allocated CQICH transmission opportunity. The first indication is sent on the eight allocated CQICH transmission opportunity. 0b11=The MIMO mode and permutation mode indication shall be transmitted on the CQICH indexed by the CQICH_ID every 16 allocated CQICH transmission opportunity. The first indication is sent on the $16^{th}$ allocated CQICH transmission opportunity. |
| Padding | Variable | Number of bits required to align to byte length, shall be set to zero. |
| } | | |

Figure 3:
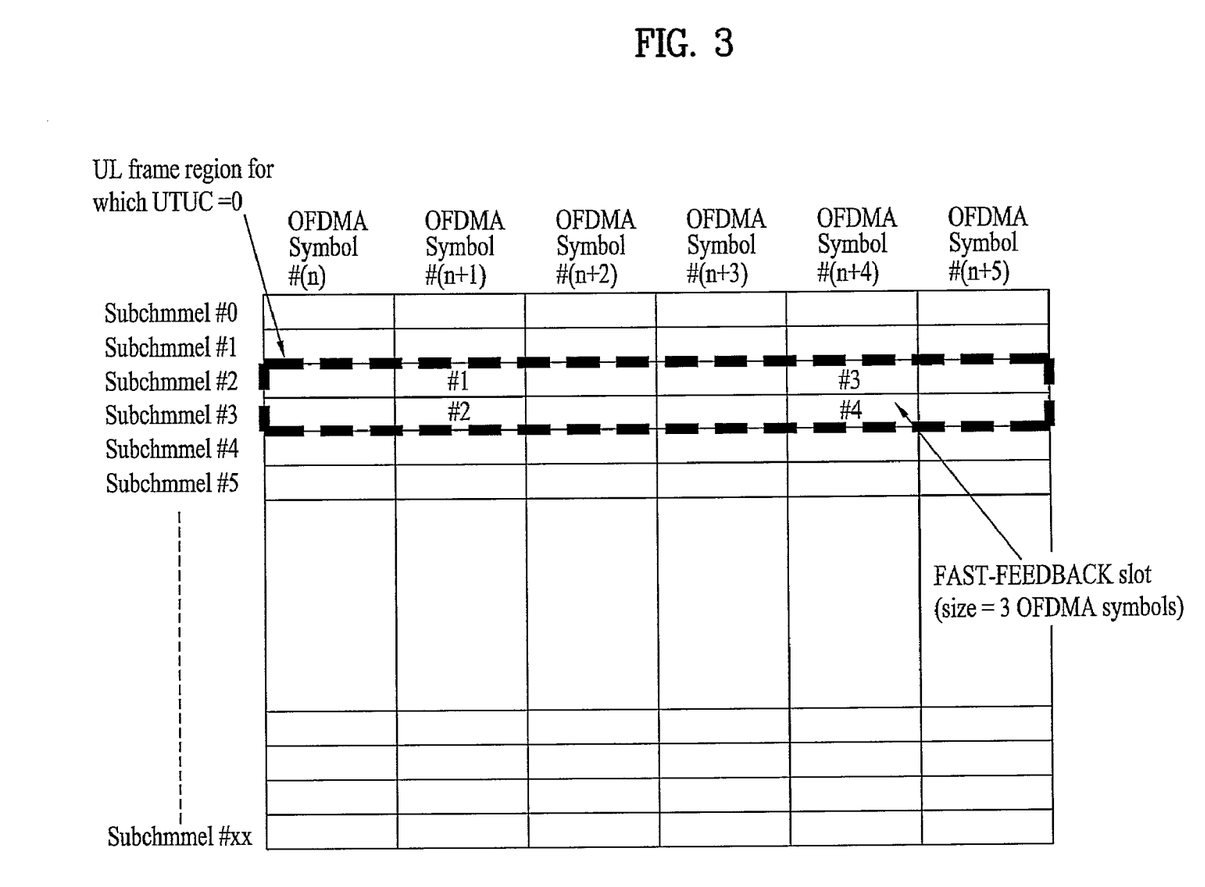
FIG. 3 shows the order of mapping a fast feedback message to the fast feedback area.

FIG. 3 shows the order of mapping a fast feedback message to the fast feedback area. As can be seen from FIG. 3, some areas of the UL sub-frame are used as the fast feedback channel. The order of channel allocation is equal to that of FIG. 3, and a single sub-channel (i.e., 48 data sub-carriers) is used to represent a single CQI (i.e., 6 bits). Each sub-channel is comprised of six tiles, and 6 tiles are distributed to all bands.

Figure 4:
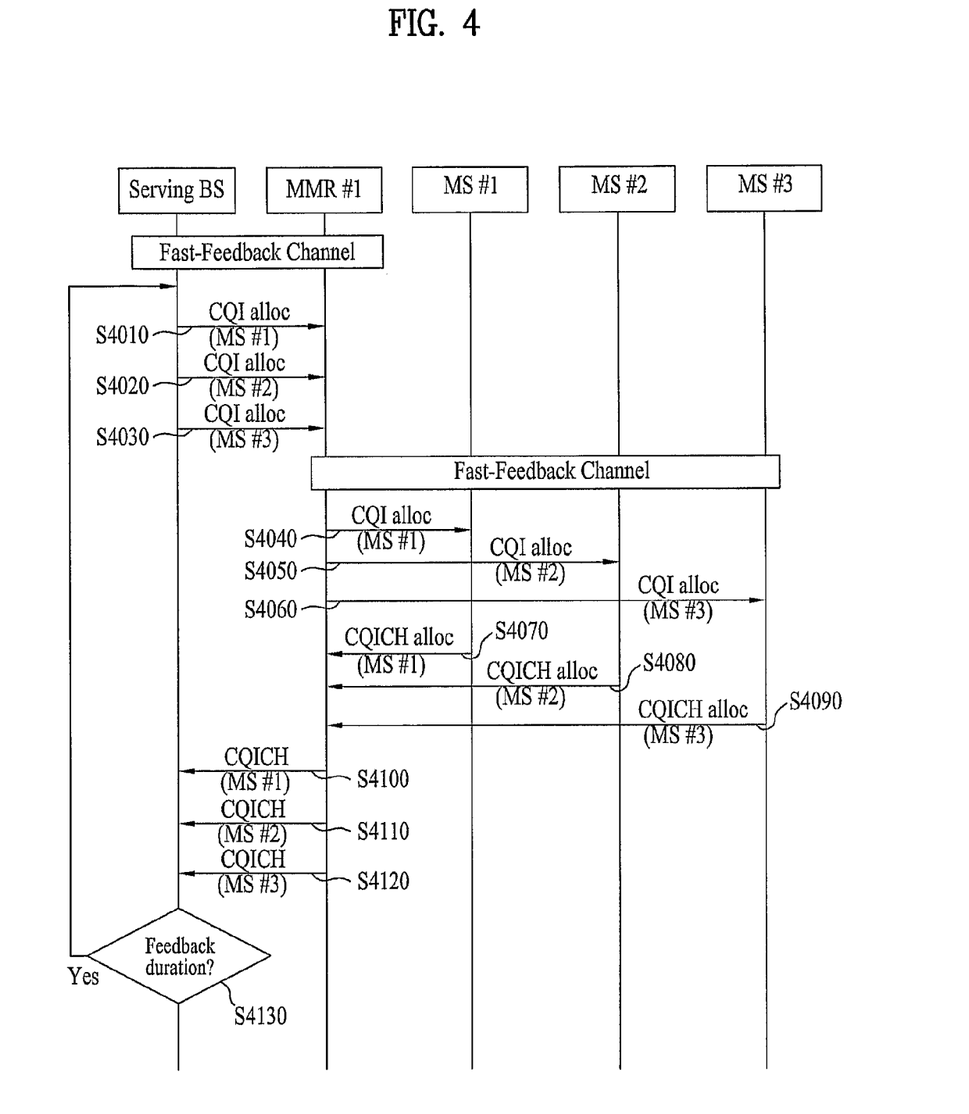
FIG. 4 is a flow chart illustrating a conventional feedback method of a MS channel status using a relay station (RS)

FIG. 4 is a flow chart illustrating a conventional feedback method of a MS channel status using a mobile RS. If a specific base station (BS) communicates with mobile stations (MSs), this base station (BS) is called a serving BS. The serving BS communicates the mobile stations using the mobile RS. In FIG. 4, MMR is indicative of a Mobile Multi hop Relay station. In order to indicate a single hop (i.e., 1 hop) between the serving BS and the RS and a single hop (i.e., 1 hop) between the RS and the MS, abbreviation (MMR) of the Mobile Multi hop Relay station is used.

In more detail, the serving BS allocates feedback resources for three mobile stations (MS#1, MS#2, and MS#3) to the mobile RS during a CQICH_Allocation IE duration using the allocated fast feedback channel at steps S4010, S4020, and S4030. The mobile RS allocates feedback channel resources to individual mobile stations of the above steps S4010~S4030 at steps S4040~S4060. Thereafter, individual mobile stations (MSs) feed back channel status information to the RS over a CQICH allocated from the RS at steps S4070~S4090. The mobile RS receives CQICH feedback information, and transmits the feedback information to the serving BS at steps S4110~S4120. If the serving BS is in the duration, it returns to the above step S4010 at step S4130.

Due to the use of the RS, a time delay may unavoidably occur in a decoding or encoding process, a system complexity may also unavoidably increase, and there arises a backward compatibility problem of a Point-to-MultiPoint (PMP) mode. If a specific mobile station (MS) uses a mobile RS of the conventional broadband OFDM wireless access system, it should be noted that a method for effectively reporting and managing channel status information is not defined in the above specific MS. Specifically, although a channel status between the mobile RS and the MS is not frequently changed, the base station (BS) must periodically allocate CQICH resources to report channel status information. A single sub-channel of using 48 data sub-carriers is used to represent a CQI indicating single channel quality information composed of 6 bits. If a transmission period of the CQI is short, unnecessary resource consumption occurs due to a frequent CQI channel allocation. If a CQI report period is long, decision of a MS path and a MCS (Modulation and Coding Scheme) level adjustment is delayed.

DISCLOSURE

Technical Problem

Accordingly, the present invention is directed to a method for controlling a feedback channel in a communication system including at least one relay station that substantially obviates one or more problems due to limitations and disadvantages of the related art.

An object of the present invention is to provide a method for controlling feedback communication of a wireless communication system including a relay station (RS) in a wireless communication-based system.

Another object of the present invention is to provide a method for controlling feedback communication of a system including a relay station (RS) according to feedback information of a mobile station (MS), and a method for transmitting/receiving data to/from the mobile station (MS).

Technical Solution

To achieve these objects and other advantages and in accordance with the purpose of the invention, as embodied and broadly described herein, a method for controlling a feedback of channel quality information of a relay station (RS) in a wireless communication system including the relay station (RS) comprising: receiving total channel quality information (CQI) and a delta CQI if necessary from a mobile station (MS); transmitting the total channel quality information (CQI) and a delta CQI to a base station (BS); receiving associated control information and data.

In another aspect of the present invention, there is provided a method for controlling a feedback of channel quality information of a mobile station (MS) for supporting a wireless communication system including a relay station (RS) comprising: transmitting total channel quality information (CQI) and a delta CQI if necessary to the relay station (RS); and receiving associated control information and data.

In another aspect of the present invention, there is provided a feedback control method for channel quality information of a relay station (RS) in a wireless communication system including the relay station (RS) comprising: receiving total channel quality information from a mobile station (MS) via a first uplink channel resource area; transmitting the channel quality information to a base station via a third uplink channel resource area; and receiving a delta CQI from the mobile station (MS) via a second uplink channel resource area.

In another aspect of the present invention, there is provided a feedback control method for channel quality information of a mobile station (MS) for supporting a wireless communication system including a relay station (RS) comprising: transmitting total channel quality information to a mobile station (MS) via a first uplink channel resource area; and transmitting a delta CQI to the relay station (RS) via a second uplink channel resource area.

It is to be understood that both the foregoing general description and the following detailed description of the present invention are exemplary and explanatory and are intended to provide further explanation of the invention as claimed.

Advantageous Effects

As described above, the present invention can effectively use resources of a wireless communication system, and can reduce a relay caused by a path decision of a mobile station (MS).

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Reference will now be made in detail to the preferred embodiments of the present invention, examples of which are illustrated in the accompanying drawings. Wherever possible, the same reference numbers will be used throughout the drawings to refer to the same or like parts.

The following embodiments will disclose a variety of application examples of the present invention, which is applied to the IEEE 802.16e system and the IEEE 802.16m system which serve as the standard specification of a multi-carrier multiple access system considering the MS mobility [See IEEE Std 802.16e-2005 and http://www.ieee802.org/16/published.html].

Figure 5:
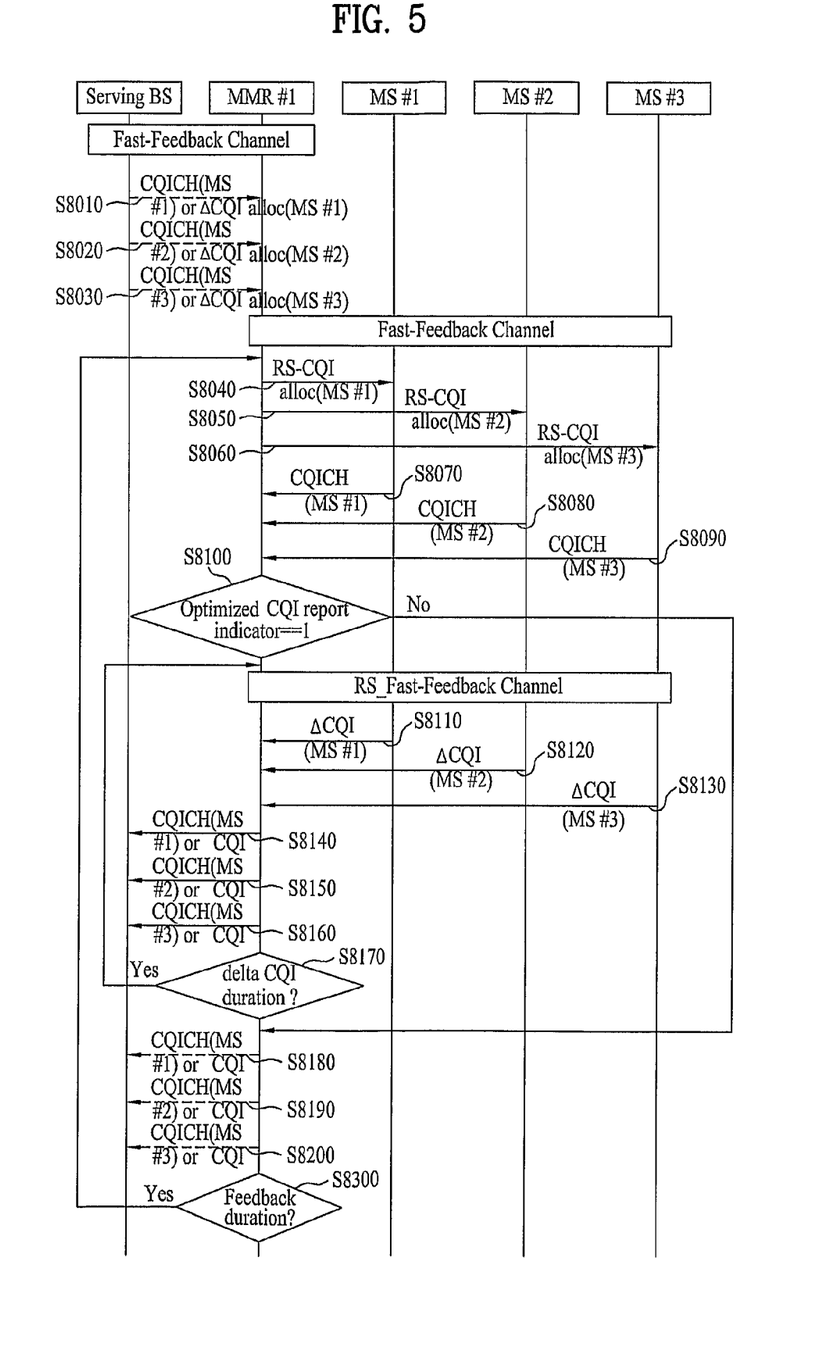
FIG. 5 is a flow chart illustrating a CQI feedback method according to one embodiment of the present invention.

FIG. 5 is a flow chart illustrating a CQI feedback method according to one embodiment of the present invention.

Referring to FIG. 5, a serving BS is a node connected to a backbone network, and communicates with the relay station (RS) and the mobile station (MS). The relay station (RS) is a node capable of communicating with the serving BS. Preferably, the RS may wirelessly communicate the serving BS. More preferably, the RS may communicate with the serving BS according to the OFDM/OFDMA scheme. The RS receives data to be transmitted to the MS from the serving BS, and transmits the received data to the MS. The RS receives data to be transmitted to the serving BS from the MS, and transmits the received data to the serving BS, such that it acts as a relay according to a series of communication procedures. As described above, it is preferable that the RS may act as a relay according to the OFDM/OFDMA scheme.

Preferably, the RS-based relay may be performed by a variety of communication methods. Data encoded by an arbitrary method may be received from the mobile station (MS), and be then decoded. The decoded data is encoded by the arbitrary method, and the encoded data is then transmitted to the above-mentioned base station (BS). For example, the amplitude of a Tx/Rx data signal of the mobile station (MS) is amplified, and is then transmitted or received. For another example, specific additional data is added to data received from the mobile station (MS), and the added resultant data is then transmitted to the base station (BS). Also, data received from the mobile station (MS) is modified, and the modified data is then transmitted to the base station (BS).

The relay station (RS) is connected to the base station (BS), and the number of the relay stations (RSs) is not limited. The MS is a node connected to either the base station (BS) or the RS. The type of the MS connected to the RS may have mobility, or may be fixed to a specific position. The channel quality information between the RS and the MS may be acquired from the RS upon receiving a request from the BS. Alternatively, the RS pre-acquires the above channel quality information before receiving the request from the BS. upon receiving the request from the BS, the RS may immediately provide the BS with the acquired channel quality information.

As can be seen from the embodiment of FIG. 5, a total of three mobile stations (MSs) are combined with a single mobile RS, and the combined result is then connected to the serving BS. In more detail, the serving BS allocates feedback resources for three mobile stations (MSs) to the mobile RS over the allocated fast feedback channel at steps S8010~S8030. In this case, at least one of a first CQICH for a total CQI and a second CQICH for a delta CQI is allocated at steps S8010~S8030.

The use of the above-mentioned delta CQI is as follows. Basically, the second CQICH for the CQI for channel-status delta information is used, instead of the CQICH for the total CQI allocated for a fast feedback. In more detail, provided that there is a little difference between a current channel status and a previous channel status, there is no need to use a large amount of control information as much as a given amount corresponding to an overall level. In this case, the control information is used to indicate a MCS level in which a channel status is reflected. Preferably, in the case of using an amount of control information as much as a given amount capable of indicating a difference (i.e., delta) between a current channel status and a previous channel status, the present invention may consider the above amount of control information to be sufficient.

The mobile RS allocates feedback channel resources to mobile stations of the above steps S8010~S8030 at steps S8040~S8060. At the above steps S8040~S8060, at least one of the first CQICH for a total CQI and the second CQICH for the delta CQI is allocated. Thereafter, a feedback communication is performed between the mobile RS and the mobile stations over a fast feedback channel indicating a basic feedback setup status during a predetermined duration (d) prescribed in 'RS_CQICH_Allocation_IE' of table 6 at steps S8040~S8180.

At an initial setup feedback step, a total CQI must be fed back. Thus each MS feeds back the total CQI to the mobile RS at steps S8070~S8090. In the case of feeding back the total CQI to compare the above-mentioned feedback of the total CQI with the feedback of the delta CQI, this operation is represented by a CQICH feedback. During the feedback duration (d), the MS checks an optimized CQI report indicator contained in 'RS_CQICH_Allocation_IE'. If the value of the optimized CQI report indicator is set to '1', a current mode is switched to a delta CQI feedback mode at step S8100. If this indicator value is '0', the present invention performs operations of steps S8180~S8200. The mobile RS transmits feedback information received from each MS to the serving BS without any change at steps S8180~S8200. The serving BS analyzes feedback information, such that it decides a path associated with the MS and adjusts the MCS level. Otherwise, the mobile RS analyzes feedback information of individual mobile stations (MSs), and transmits the analyzed values to the serving BS, such that the serving BS may perform a path decision associated with the MS and an MCS level according to the feedback analysis result of the mobile RS. In other words, the RS receives feedback information of each MS, and determines whether delta CQI values of Tables 2, 3, and 4 are continuously below a reference value during a predetermined period. If it is determined that the delta CQI values of Tables 2, 3, and 4 are continuously below the reference value during the predetermined period, the present invention may allow a corresponding MS to directly communicate with the serving BS without passing through the RS, or may allow a corresponding MS to directly decide for the corresponding MS to be allocated to other peripheral RS areas. For this operation, the present invention must allocate channel resources for transmitting control information to the serving BS.

Thereafter, the present invention determines whether a current time is in the duration (d) by referring to a current RS_CQICH_Allocation_IE message. If it is determined that the current time is in the duration (d), the present invention returns to step S8040. If the optimized CQI indicator is set to '1' at step S8100, a delta CQI feedback operation is performed during a predetermined time corresponding to the number of frames prescribed in the RS duration (rd) parameter allocated to the RS_CQICH_Allocation_IE message. Therefore, individual mobile stations (MSs) feed back the delta CQI to the RS at steps S8110~S8130. The RS transmits the total CQI or the delta CQI to the serving BS according to individual values of the above durations at steps S8140~S8170. Thereafter, the present invention determines whether the RS duration (rd) allocated to the RS_CQICH_Allocation_IE message has elapsed at step S8170. If it is determined that the RS duration (rd) allocated to the RS_CQICH_Allocation_IE message has not elapsed at step S8170, the present invention returns to the above step S8100. Otherwise, if it is determined that the RS duration (rd) allocated to the RS_CQICH_Allocation_IE message has elapsed at step S8170, the present invention determines whether a current time is in the duration (d) contained in the RS_CQICH_Allocation_IE message at step S8300. If it is determined that the current time is in the duration (d) contained in the RS_CQICH_Allocation_IE message at step S8300, the present invention returns to step S8040. If the duration (d) has elapsed, the present invention stops the above feedback procedure.

Feedback information loaded on a fast feedback channel according to the present invention may be a Carrier to Interference Noise Ratio (CINR) or a Received Signal Strength Indication (RSSI). The CINR or the RSSI shows an exemplary parameter for indicating a channel quality. The fast feedback channel message may include another-format parameter.

Figure 6:
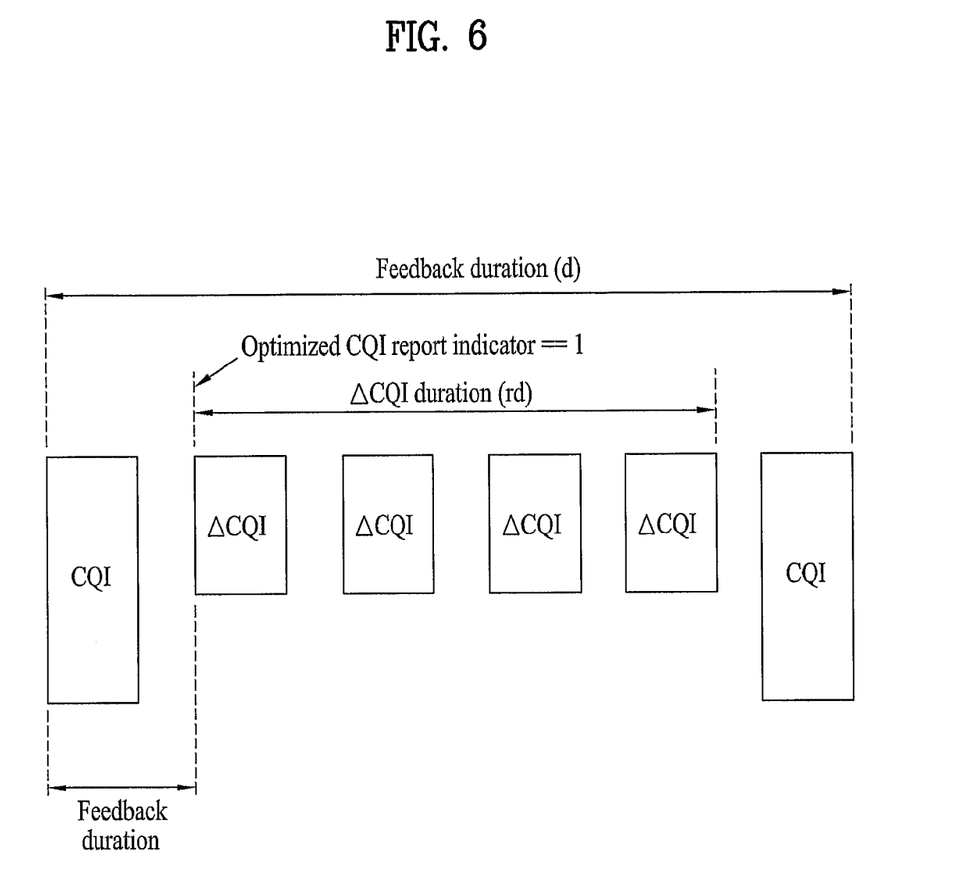
FIG. 6 is a conceptual diagram illustrating a feedback transmission procedure according to one embodiment of the present invention.

FIG. 6 is a conceptual diagram illustrating a feedback transmission procedure according to one embodiment of the present invention. In more detail, when the MS of FIG. 5 transmits feedback information to the RS, FIG. 6 shows which CQI feedback information is transmitted according to a first duration (d) or second duration (rd) prescribed in the RS_CQICH_Allocation_IE message. If the MS enters a feedback transmission interval, a feedback operation is performed during the duration (d). As shown in FIG. 5, if the optimized CQI report indicator is set to '1', the delta CQI is transmitted during the RS duration (rd). In other words, provided that a path decision is made to allow the MS to communicate with the BS via the mobile RS, and then allows the MS to periodically report channel quality information, the CQI report between the MS and the mobile RS is conducted by increasing the period of the total CQI. Only the delta CQI indicating a variable value of the pre-transmitted CQI is transmitted while the optimized CQI report indicator is set to '1'.

Figure 7:
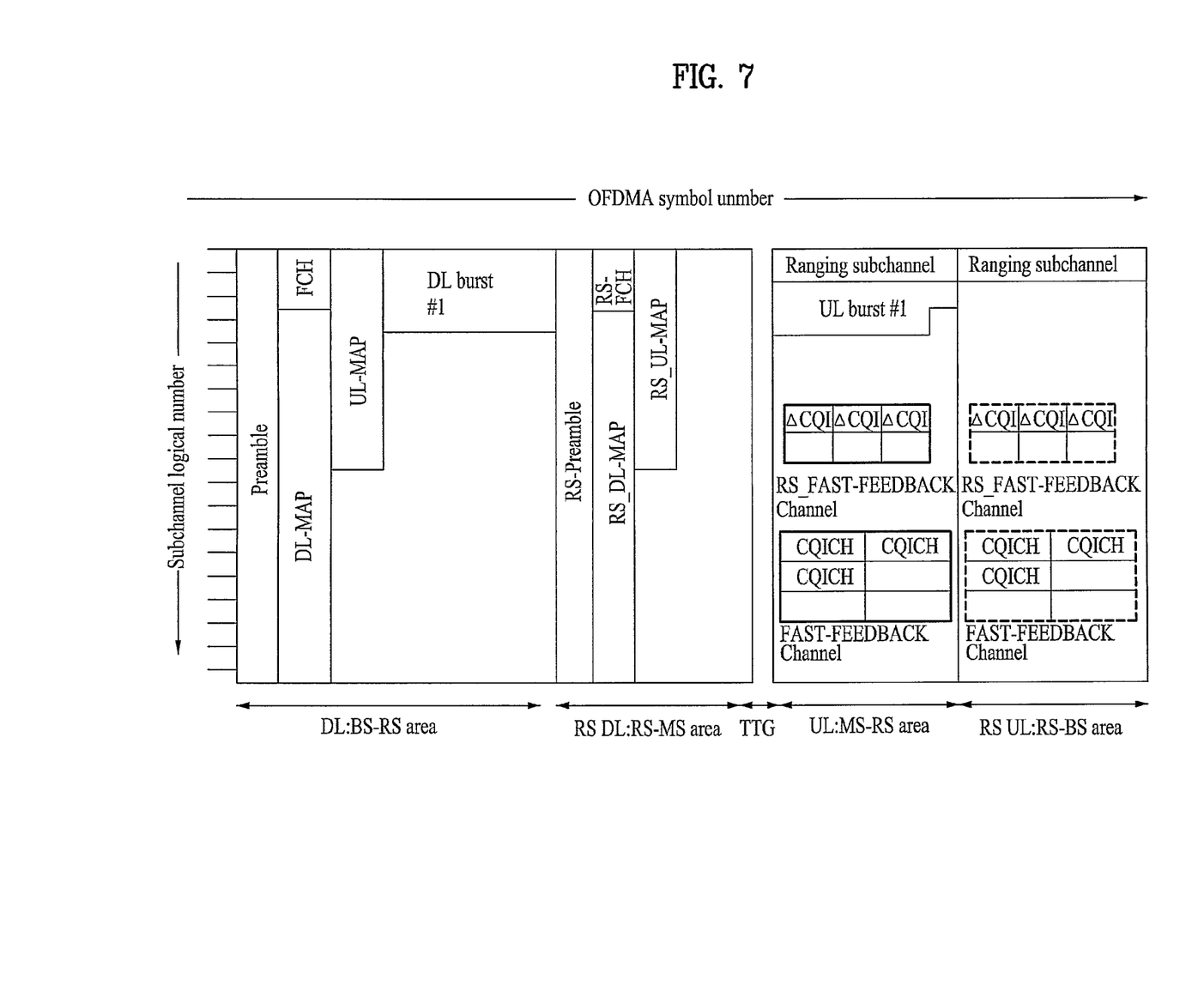
FIG. 7 is a structural diagram illustrating a frame structure of a RS fast feedback channel according to one embodiment of the present invention.

FIG. 7 shows a frame structure according to the present invention. Referring to FIG. 7, the frame structure for supporting the RS fast feedback channel includes a 'DL:BS-RS' area, a 'RS DL:RS-MS' area, a 'UL:MS-RS' area, and a 'RS UL:RS-BS' area. The 'DL:BS-RS' area is allocated for a downlink between the BS and the RS. The 'RS DL:RS-MS' area is allocated for a downlink between the RS and the MS. The 'UL:MS-RS' area is allocated for an uplink between the MS and the RS. The 'RS UL:RS-BS' area is allocated for an uplink between the RS and the BS. The RS preamble on the 'RS DL:RS-MS' area is used to establish synchronization and equalization in a physical layer between the RS and the MS. The RS_DL-MAP and RS_UL-MAP messages provide channel allocation information of data bursts in uplink/downlink between the RS and the MS. The RS-FCH message provides channel allocation information and channel code information associated with the RS_DL-MAP and RS_UL-MAP messages.

The UL:MS-RS area acts as an MS-RS uplink area. In the UL:MS-RS area, the RS is able to receive MS channel quality information (CQI). In the UL:MS-RS area, the BS allocates uplink resources (i.e., RS UL:MS-RS), such that each MS is able to transmit the CQI using the CQICH_Allocation_IE or RS_CQICH_Allocation_IE message over the fast feedback channel or the RS fast feedback channel. In the UL:MS-RS area, the MS transmits the total CQI at intervals of a predetermined time, or transmits only the delta CQI as necessary, such that resources for two feedbacks are needed. Channel resource allocation for the total CQI is called a first channel resource allocation. Channel resource allocation for the delta CQI is called a second channel resource allocation.

The RS UL:RS-BS area acts as a RS-BS uplink area. In the RS UL:RS-BS area, the MS transmits data to the BS according to a direct scheme or the RS transmits the CQI of the MS according to an indirect scheme. Feedback channel resource allocations of the steps S8010~S8030 of FIG. 5 are changed to others according to the direct or indirect scheme. In the RS UL:RS-BS area, the BS allocates uplink resources (RS UL:MS-RS), such that each MS transmits the CQI using the CQICH_Allocation_IE or RS_CQICH_Allocation_IE message over the fast feedback channel or the RS fast feedback channel. In the RS UL:RS-BS area, the total CQI or only the delta CQI may be transmitted when the RS transmits feedback information to the BS, differently from the UL:MS-RS area. As a result, it is preferable for only one of two resources to be allocated. Channel resource allocation for the total CQI is called a third channel resource allocation. Channel resource allocation for the delta CQI is called a fourth channel resource allocation. As described above, the RS does not transmit feedback information to the BS, but analyzes the feedback information by itself, such that it may need to allocate fifth channel resources capable of transmitting only control information corresponding to the analyzed result to the BS. In FIG. 7, TTG is indicative of a Transmission Time Gap, and is allocated to prevent interference between a downlink burst and an uplink burst. Next, feedback channel resource-allocation in the above-mentioned areas will hereinafter be described in detail.

In FIG. 7, the fast feedback channel acts as uplink resources via which the BS receives the total CQI between the MS and the RS, and is allocated to the MS-RS uplink or the RS-BS uplink area. The fast feedback channel is independently allocated to the MS, such that PHY-associated information requesting a high-speed response is transmitted to the MS. The above-mentioned independent allocation is based on the unicast scheme via the FAST_FEEDBACK MAC subheader or CQICH Allocation IE message, and the above-mentioned transmission has occurred in only a specific UL area prescribed by 'UIUC=0'.

The fast feedback slot is composed of a single OFDMA slot mapped by a specific scheme similar to a normal uplink data mapping scheme. The fast feedback slot uses the QPSK modulation on 48 data sub-carriers contained in a corresponding slot, and transmits a data payload of 4 bits. In the case of the IEEE 802.16e system, the total CQI indicates that 6 bits are transmitted through the CQICH by using a single sub-channel composed of 48 data sub-carriers (i.e., 6-tile structure).

In FIG. 7, the RS fast feedback channel acts as uplink resources via which the BS receives the delta CQI between the MS and the RS, and is allocated to the MS-RS uplink or the RS-BS uplink. The MS-RS uplink is indicative of an uplink area in which the RS receives the delta CQI of the MS. The RS-BS uplink is indicative of uplink resources via which the RS transmits the CQI of the MS. In the case of the IEEE 802.16e system, the total CQI indicates that 6 bits are transmitted by a single sub-channel composed of 48 data sub-carriers (i.e., 6-tile structure). The delta CQI may transmit only the difference in the pre-transmitted total CQI value using the ½ sub-channel (i.e., 3-tile structure), the 2-tile structure or the 1-tile structure. During the CQI report procedure between the mobile RS and the BS, 6 bits may be transmitted through the CQICH in the same manner as in the conventional art, or only the delta CQI may be transmitted through the CQICH.

The following Table 2 shows embodiments of the delta CQI under the 3-tile structure. The delta CQI values and associated meanings under the 3-tile structure are shown in the following Table 2. The following Table 3 shows embodiments of the delta CQI under the 2-tile structure. The delta CQI values and associated meanings under the 2-tile structure are shown in the following Table 3. The following Table 4 shows embodiments of the delta CQI under the 1-tile structure. The delta CQI values and associated meanings under the 1-tile structure are shown in the following Table 4.

TABLE 2

| 3-bit Payload(binary) | Value (db) |
| --- | --- |
| 000 | −4 |
| 001 | −3 |
| 010 | −2 |
| 011 | −1 |
| 100 | 0 |
| 101 | 1 |
| 110 | 2 |
| 111 | 3 |

In the case of using the 3-tile structure, CQI information of 3 bits is fed back via 24 data sub-carriers. By means of the feedback information, the base station (BS) or the relay station (RS) adjusts the MCS level or the path setup associated with the MS, and transmits the resultant data to the MS. For example, the MCS level for reflecting a channel status on the basis of the 3-bit payload value of 0b100 shown in Table 2 may be increased or decreased by 1 dB, or a channel status is decided, such that the present invention can determine whether the MS is to be assigned to another RS or can determine whether the MS directly or indirectly communicates with another BS.

TABLE 3

| 2-bit Payload(binary) | Value |
|---|---|
| 00 | −2 |
| 01 | −1 |
| 10 | 0 |
| 11 | 1 |

In the case of using the 2-tile structure, CQI information of 2 bits is fed back via 16 data sub-carriers. By means of the feedback information, the base station (BS) or the relay station (RS) adjusts the MCS level or the path setup associated with the MS, and transmits the resultant data to the MS.

TABLE 4

| 1-bit Payload(binary) | Value |
|---|---|
| 0 | −1 |
| 1 | 1 |

In the case of using the 1-tile structure, CQI information of 1 bit is fed back via 8 data sub-carriers. By means of the feedback information, the base station (BS) or the relay station (RS) adjusts the MCS level or the path setup associated with the MS, and transmits the resultant data to the MS.

A variety of functions of the RS fast feedback channel have been described as described above, and a method for allocating the RS feedback channel will hereinafter be described in detail.

The following Table 5 shows the RS_Fast_Feedback_Allocation_IE message according to the present invention. The RS_Fast_Feedback_Allocation_IE message is used as the fast feedback allocation information element for allocating the RS fast feedback area of FIG. 7 to the UL:MS-RS area of FIG. 7. Thereafter, the present invention designates the slot for each MS using the RS_CQICH_Allocation_IE message.

The RS_Fast_Feedback_Allocation_IE message and the RS_CQICH_Allocation_IE message will hereinafter be described in detail. A variety of values allocated to the RS_Fast_Feedback_Allocation_IE message will hereinafter be described with reference to the following Table 5, and a variety of values allocated to the RS_CQICH_Allocation_IE message along with the conventional CQICH_Allocation_IE message will hereinafter be described with reference to the following Table 6.

TABLE 5

| Syntax | Size | Notes |
|---|---|---|
| RS-FASTFEEDBACK_Allocation_IE( ) | | |
| { | | |
| OFDMA symbol offset | 8 bits | |
| Subchannel offset | 7 bits | |
| No. OFDMA symbols | 7 bits | |
| No subchannels | 7 bits | |
| Reserved | 3 bits | |
| } | | |

Table 5 shows a variety of values allocated to the RS_Fast_Feedback_Allocation_IE message according to one embodiment of the present invention.

An OFDMA symbol offset indicates a transmission start position of a burst. The offset value is defined in units of an OFDMA symbol, and is associated with an allocation start time field given to the UL-MAP message.

A sub-channel offset is a sub-channel index used for transmitting the burst, and begins from '0'.

In Table 5, 'No. OFDMA Symbols' is indicative of the number of OFDMA symbols used for transmitting the uplink burst.

'No. sub-channels' is indicative of the number of sub-channels having consecutive indexes.

The following Table 6 shows a variety of values allocated to the RS_CQICH_Allocation_IE message along with the conventional CQICH_Allocation_IE message.

Prior to describing the RS_CQICH_Allocation IE message, the conventional CQICH_Allocation_IE message will hereinafter be described in detail. The CQICH_Allocation_IE message has been used to dynamically allocate the CQICH to the mobile station (MS) or release the CQICH from the mobile station (MS). If the CQICH has been allocated to the MS, the MS transmits channel quality information (CQI) over the CQICH allocated to the continuously-transmitted frame. The above-mentioned process has been continued until receiving the CQICH_Allocation_IE message releasing the allocated CQICH.

The RS_CQICH_Allocation IE message dynamically allocates the RS_CQICH to the MS uplink or cancels the allocated area. If the RS_CQICH has been allocated, the MS transmits QoS (Quality of Signal) information to the allocated RS_CQICH area at intervals of a given period prescribed in the RS_CQICH_Allocation IE message. If the MS cancels the allocated RS_CQICH, i.e., if the duration parameter contained in the RS_CQICH_Allocation IE message is set to '0', the MS does not transmit the QoS information to the base station (BS). When the MS CQI information is transmitted through the fast feedback channel or the RS fast feedback channel, the RS_CQICH_Allocation IE message includes specific information by which the BS is able to inform the MS of destination and method information of the total CQI or the delta CQI.

TABLE 6

| Syntax | Size |
|---|---|
| Optimized CQI report indicator | 1 bit |
| If (Optimized CQI report indicator == 1) { | |
| RS-Allocation offset | 6 bits |
| Delta CQI Period (dp) | 2 bits |
| RS-Frame offset | 3 bits |
| RS-Duration (rd) | 3 bits |
| } | |

Except for the new parameters shown in Table 6, the present invention uses the conventional CQICH_Allocation_IE message shown in the above Table 1 without any change. Detailed roles of individual parameters will hereinafter be described in detail.

With reference to Table 6, the optimized CQI report indicator is used as an indicator capable of determining whether the MS reports the delta CQI to the RS. If the parameter value is set to '1', there is a need to feed back only the delta CQI value. If the optimized CQI report indicator is set to '1', the present invention sets the RS allocation offset (6 bits) for indicating the index of the RS fast feedback channel area of UIUC=0, and feeds back the delta CQI through the CQICH allocated for each $2^{dp}$ frame using the delta CQI period (dp) parameter value of 2 bits.

The RS frame offset is composed of 3 bits, and allows the MS to begin to report at a frame corresponding to three LSBs equal to a specific frame offset. If a current frame is specified, the MS must begin to report after 8 frames have elapsed.

The RS duration (rd) is composed of 3 bits, and allows the delta CQI feedback information to be transmitted through the CQICH channel indexed by the CQICH ID parameter shown in Table 6 during the $2^{rd}$ frame according to the setup 'rd' value. If the 'rd' value is set to '0', the CQICH is not allocated. If the 'rd' value is set to '0b111', the MS transmits the delta CQI feedback information until receiving a stop command from the base station (BS).

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As apparent from the above description, the present invention can effectively use resources of a wireless communication system, and can reduce a relay caused by a path decision of a mobile station (MS).

The invention claimed is:

1. A feedback control method for channel quality information of a relay station (RS) in a wireless communication system including the relay station (RS), the method comprising:
   receiving, by the relay station (RS), total channel quality information from a mobile station (MS) via a first uplink channel resource area;
   when an optimized channel quality indicator (CQI) report indicator received from the mobile station (MS) is set to 1, receiving, by the relay station (RS), a plurality of delta information of the channel quality information from the mobile station (MS) via a second uplink channel resource area;
   transmitting, by the relay station (RS), at least one of the channel quality information and the plurality of delta information to a base station (BS) if values of the plurality of delta information are continuously smaller than a predetermined value for a predetermined duration of time; and
   acquiring, by the relay station (RS), control information by analyzing the at least one of the channel quality information and the plurality of delta information if the values of the plurality delta information are not continuously smaller than the predetermined value for the predetermined duration of time,
   wherein the mobile station (MS) communicates directly with the base station (BS) without passing data through the relay station (RS) if the values of the plurality of delta information are continuously smaller than the predetermined value for the predetermined duration of time.

2. The feedback control method according to claim 1, wherein the step of transmitting the at least one of the channel quality information and the plurality of delta information to the base station (BS) comprises:
   transmitting the plurality of delta information via another uplink channel resource.

3. The feedback control method according to claim 1, further comprising: transmitting the acquired control information to the base station (BS) via another uplink channel resource.

4. The feedback control method according to claim 1, further comprising: transmitting data, in which the at least one of the channel quality information and the plurality of delta information of the channel quality information is reflected, to the mobile station (MS).

5. The feedback control method according to claim 1, further comprising:
   transmitting the acquired control information, in which at least one of the channel quality information and delta information of the channel quality information is reflected, to the mobile station (MS).

6. A feedback control method for channel quality information of a mobile station (MS) for supporting a wireless communication system including a relay station (RS), the method comprising:
   transmitting, by the mobile station (MS), total channel quality information to the relay station (RS) via a first uplink channel resource area; and
   when an optimized channel quality indicator (CQI) report indicator associated with the total channel quality information is set to 1, transmitting, by the mobile station (MS), a plurality of delta information of the channel quality information to the relay station (RS) via a second uplink channel resource area,
   wherein the relay station (RS) transmits at least one of the channel quality information and the plurality of delta information to a base station (BS) if values of the plurality of delta information are continuously smaller than a predetermined value for a predetermined duration of time,
   wherein the relay station (RS) acquires control information by analyzing the at least one of the channel quality information and the plurality of delta information if the values of the plurality delta information are not continuously smaller than the predetermined value for the predetermined duration of time, and
   wherein the mobile station (MS) communicates directly with the base station (BS) without passing data through the relay station (RS) if the values of the plurality of delta information are continuously smaller than the predetermined value for the predetermined duration of time.

7. The feedback control method according to claim 6, further comprising:
   receiving data, in which the at least one of the channel quality information and delta information of the channel quality information is reflected, from the relay station (RS).

8. The feedback control method according to claim 6, further comprising:
   receiving the acquired control information, in which the at least one of the channel quality information and the plurality of delta information of the channel quality information is reflected, from the relay station (RS).

9. The feedback control method according to claim 8, further comprising:
   transmitting the at least one of the channel quality information and the plurality of delta information of the channel quality information to a base station (BS) according to the received control information.

10. The feedback control method according to claim 8, further comprising:
    transmitting the at least one of the channel quality information and the plurality of delta information of the channel quality information according to the control information received from the relay station (RS); and
    receiving associated control information or data via another relay station newly connected to the wireless communication system.

11. A mobile station (MS) configured to perform a feedback control method for channel quality information for supporting a wireless communication system including a relay station (RS), the mobile station (MS) comprising:
    a transceiver configured to
    transmit total channel quality information to the relay station (RS) via a first uplink channel resource area,
    when an optimized channel quality indicator (CQI) report indicator associated with the total channel quality information is set to 1, transmit a plurality of delta information of the channel quality information to the relay station (RS) via a second uplink channel resource area,
    wherein at least one of the channel quality information and the plurality of delta information are transmitted, by the relay station (RS), to a base station (BS) if values of the plurality of delta information are continuously smaller than a predetermined value for a predetermined duration of time,
    wherein at least one of the channel quality information and the plurality of delta information are analyzed by the relay station (RS) for acquiring control information if the values of the plurality delta information are not continuously smaller than the predetermined value for the predetermined duration of time, and
    communicate directly with the base station (BS) without passing data through the relay station (RS) if values of the plurality of delta information are continuously smaller than the predetermined value for the predetermined duration of time.

* * * * *